US012276031B2

United States Patent
Huang et al.

(10) Patent No.: US 12,276,031 B2
(45) Date of Patent: Apr. 15, 2025

(54) DEVICE AND METHOD FOR FABRICATING CERAMIC REINFORCED COMPOSITE COATING BASED ON PLASMA REMELTING AND INJECTION

(71) Applicant: HEFEI UNIVERSITY OF TECHNOLOGY, Anhui (CN)

(72) Inventors: Haihong Huang, Anhui (CN); Hongmeng Xu, Anhui (CN); Lunwu Zhao, Anhui (CN); Yun Liu, Anhui (CN); Zhifeng Liu, Anhui (CN)

(73) Assignee: HEFEI UNIVERSITY OF TECHNOLOGY, Anhui (CN)

( * ) Notice: Subject to any disclaimer, the term of this patent is extended or adjusted under 35 U.S.C. 154(b) by 802 days.

(21) Appl. No.: 17/523,671

(22) Filed: Nov. 10, 2021

(65) Prior Publication Data

US 2022/0380880 A1 Dec. 1, 2022

Related U.S. Application Data

(63) Continuation of application No. PCT/CN2021/116289, filed on Sep. 2, 2021.

(30) Foreign Application Priority Data

May 31, 2021 (CN) .......................... 202110597092.6

(51) Int. Cl.
*C23C 4/134* (2016.01)
*C23C 4/10* (2016.01)
(Continued)

(52) U.S. Cl.
CPC ............. *C23C 4/134* (2016.01); *C23C 4/10* (2013.01); *H05H 1/28* (2013.01); *H05H 1/34* (2013.01);
(Continued)

(58) Field of Classification Search
CPC .. H05H 1/28; H05H 1/34; H05H 1/42; H05H 2245/40; H05H 2242/10; C23C 4/134; C23C 4/10
See application file for complete search history.

(56) References Cited

U.S. PATENT DOCUMENTS 4,170,607 A * 10/1979 Lamberti .............. C07C 59/315
562/568
5,047,612 A * 9/1991 Savkar ...................... H05H 1/42
219/76.16
(Continued)

FOREIGN PATENT DOCUMENTS

CN 104096958 A 10/2014
CN 108746959 A 11/2018
(Continued)

OTHER PUBLICATIONS

Machine Translation of Wang (CN 108746959), Performed on Oct. 2024 (Year: 2018).*

(Continued)

*Primary Examiner* — Brian W Jennison
(74) *Attorney, Agent, or Firm* — Hodgson Russ LLP

(57) ABSTRACT

A device and a method for fabricating a ceramic reinforced composite coating based on plasma remelting and injection. The device includes a plasma cladding assembly, a powder feeding assembly, a metal-based substrate, and a thermal infrared imager. The plasma cladding assembly comprises a plasma gun and a plasma generator. A plasma arc generated is used to heat the substrate and form a molten pool on the substrate. The powder feeding assembly comprises a powder feeder configured to feed ceramic particles to the molten pool through a powder feeding copper tube. The thermal infrared imager is configured to acquire an infrared image of the molten pool and acquire an optimal injection position of the ceramic particles according to the infrared image. The optimal injection position is a midpoint between a trailing edge of the plasma arc emitted on the substrate and a trailing edge of the molten pool.

16 Claims, 4 Drawing Sheets

(51) Int. Cl.
*H05H 1/28* (2006.01)
*H05H 1/34* (2006.01)
*H05H 1/42* (2006.01)

(52) U.S. Cl.
CPC ........... *H05H 1/42* (2013.01); *H05H 2242/10* (2013.01); *H05H 2245/40* (2021.05)

(56) References Cited

U.S. PATENT DOCUMENTS 5,452,854 A * 9/1995 Keller ................. B05B 13/0636
219/121.48
2004/0133298 A1 7/2004 Toyserkani et al.

FOREIGN PATENT DOCUMENTS

| CN | 110184599 | A | 8/2019 |
| CN | 209481794 | U | 10/2019 |
| CN | 113322461 | A | 8/2021 |

OTHER PUBLICATIONS

WIPO, International Search Report and Written Opinion for PCT/CN2021/116289, Dec. 24, 2021.
CNIPA, First Office Action for CN Application No. 202110597092.6, Jan. 5, 2022.
CNIPA, Second Office Action for CN Application No. 202110597092.6, Aug. 2, 2022.

* cited by examiner

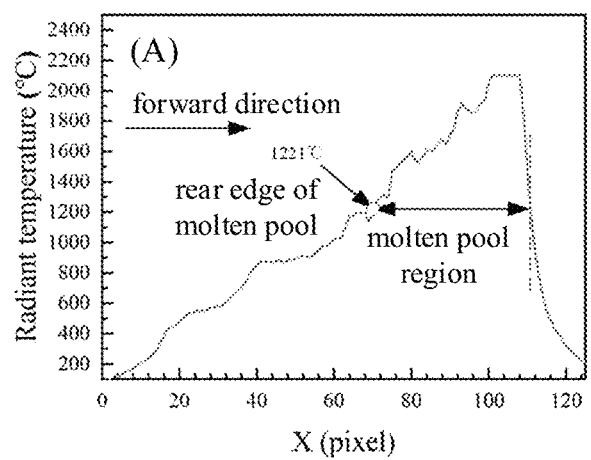
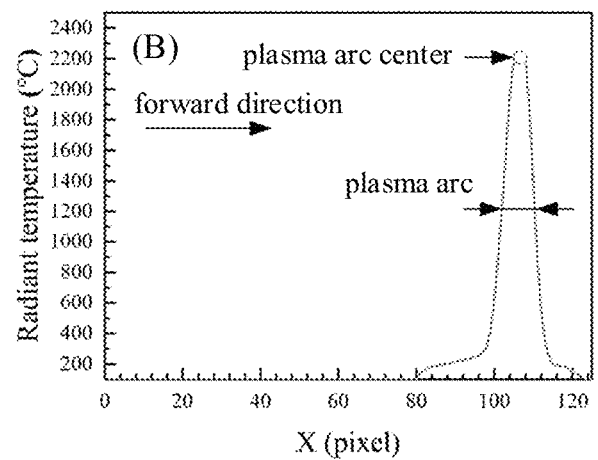
FIG. 5A    FIG. 5B
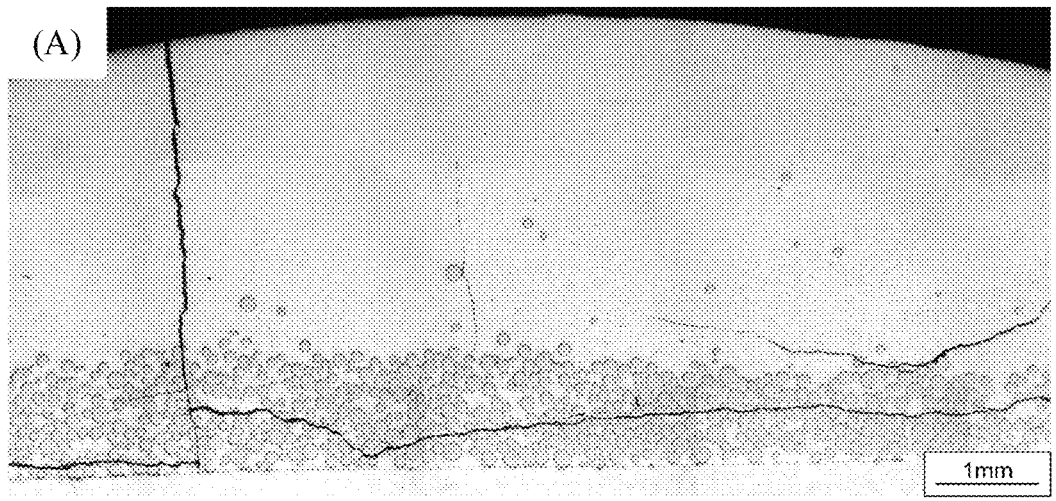
FIG. 6A
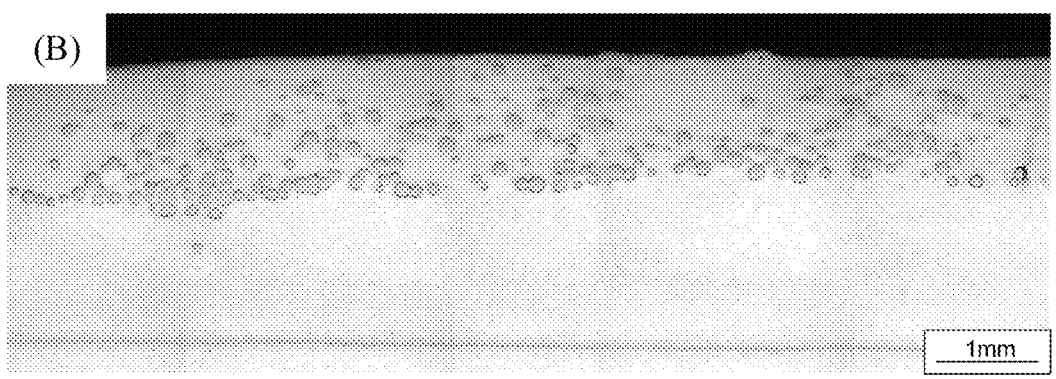
FIG. 6B

DEVICE AND METHOD FOR FABRICATING CERAMIC REINFORCED COMPOSITE COATING BASED ON PLASMA REMELTING AND INJECTION

CROSS-REFERENCE TO RELATED APPLICATION

This application is a continuation of International Application No. PCT/CN2021/116289, filed on Sep. 2, 2021, which claims priority to, and the benefits of, Chinese Patent Application No. 202110597092.6, filed on May 31, 2021, the entire contents of which are incorporated herein by reference.

FIELD

The invention belongs to the technical field of material surface modification, and specifically relates to a device and a method for fabricating a ceramic reinforced composite coating based on plasma remelting and injection.

BACKGROUND

For coating materials with the desire for good wear resistance and corrosion resistance, a balance between a strength and a toughness of a coating needs to be determined carefully due to an inverse relation between the strength and the toughness. Compared with traditional alloy coatings, a ceramic reinforced metal matrix composite coating not only process high toughness, good plasticity, and relatively low cost of metal material, but also process high hardness, excellent wear and corrosion resistance. Therefore, the outstanding of ceramic reinforced metal matrix composite coatings make it promising for many fields, especially for some mechanical parts in harsh operating conditions.

For the existing methods or systems for fabricating the composite coating, problems of the decomposition and segregation of the ceramic particles may occur. Reinforcing ceramic particles and metal matrix composites are quite different in density, and thus the reinforcing particles tend to be segregated in the coating during the fabrication process, which further increases the difference in thermal expansion coefficient, resulting in coating cracking.

SUMMARY

Embodiments of the present disclosure seek to solve at least one of the problems existing in the related art to at least some extent.

Accordingly, the present disclosure provides in embodiments a device and a method for fabricating a ceramic reinforced composite coating based on plasma remelting and injection.

In a first aspect of the present disclosure, a device for fabricating a ceramic reinforced composite coating based on plasma remelting and injection is provided. In some embodiments, the device includes: a plasma cladding assembly, a powder feeding assembly, a worktable, a metal-based substrate arranged on the worktable, and a thermal infrared imager. The plasma cladding assembly includes a plasma gun and a plasma generator. The plasma gun is arranged above the metal-based substrate and is connected to the plasma generator, and the plasma generator is configured to generate a plasma arc beam, and the plasma arc beam is used to heat the metal-based substrate and form a molten pool on a surface of the metal-based substrate. The powder feeding assembly includes a powder feeding copper tube, a powder feeder and an adjustable connecting assembly. The powder feeding copper tube is connected to the plasma gun via the adjustable connecting assembly, the powder feeder is connected to the powder feeding copper tube and is configured to feed ceramic particles to the molten pool through the powder feeding copper tube. The thermal infrared imager is configured to acquire an infrared image of the molten pool and acquire an optimal injection position of the ceramic particles according to the infrared image. The optimal injection position is a midpoint between a trailing edge of the plasma arc beam emitted on the metal-based substrate and a trailing edge of the molten pool.

In some embodiments, the adjustable connecting assembly includes a horizontal direction-adjustable connecting piece, a vertical direction-adjustable connecting piece and an angle-adjustable connecting piece. An end of the horizontal direction-adjustable connecting piece is connected to the plasma gun, and a horizontal groove is provided at the other end of the horizontal direction-adjustable connecting piece. The vertical direction-adjustable connecting piece is provided with a vertical groove, the horizontal groove of the horizontal direction-adjustable connecting piece and the vertical groove of the vertical direction-adjustable connecting piece are connected by a bolt, and an end of the vertical direction-adjustable connecting piece is provided with a threaded hole. The angle-adjustable connecting piece is connected to the vertical direction-adjustable connecting piece by fitting a threaded nail into the threaded hole, and is connected to the powder feeding copper tube.

In some embodiments, the horizontal direction-adjustable connecting piece is connected to the plasma gun via a stainless steel hose clamp. The angle-adjustable connecting piece is connected to the powder feeding copper tube via a stainless steel hose clamp.

In some embodiments, the powder feeding assembly further includes a water cooling assembly including a water cooler, and a cooling jacket surrounding the powder feeding copper tube. A water inlet and a water outlet are provided at the cooling jacket, the water cooler is configured to cool the powder feeding copper tube by feeding water into the cooling jacket through the water inlet and discharging water through the water outlet.

In some embodiments, the image acquired by the thermal infrared imager is calibrated according to formula (1):

$$L_1 = L_2 \times \alpha(d) \quad (1)$$

where $\alpha(d)$ is a calibration factor representing a ratio of a real length $L_1$ to a corresponding length $L_2$ of the image.

In some embodiments, the optimal injection position is calculated by formula (2):

$$x_3 = \frac{x_1 + x_2 - r_1 \div a(d)}{2} \quad (2)$$

where $x_1$ represents a coordinate of the trailing edge of the molten pool (4) which has a liquidus temperature of the metal-based substrate determined by the thermal infrared imager, $x_2$ represents a coordinate of a plasma arc beam center which has a highest temperature of a plasma arc beam determined by the thermal infrared imager, $x_3$ represents a coordinate of the optimal injection position, and $r_1$ represents a plasma transferred arc radius, being a parameter of the plasma gun.

In some embodiments, the plasma transferred arc radius is in a range of 1.5 to 3 mm.

In some embodiments, the horizontal direction-adjustable connecting piece and the vertical direction-adjustable connecting piece are configured to adjust a position of the powder feeding copper tube in such a way that a height h between a nozzle center of the powder feeding copper tube and the metal-based substrate is in a range of 8 to 12 mm, and a distance $b_1$ between the nozzle center of the powder feeding copper tube and a center of the plasma gun is in a range of 8 to 20 mm.

In some embodiments, the angle-adjustable connecting piece is configured to adjust an injection angle θ of the powder feeding copper tube. The injection angle θ is calculated by formula (3):

$$\theta = \arctan\frac{h}{b_1 - (x_2 - x_3) \times a(d)}. \tag{3}$$

In some embodiments, the ceramic particles are one or more selected from the group consisting of WC, TiC, and $Al_2O_3$, and/or have a particle size in a range of 50 to 300 μm.

In some embodiments, the metal-based substrate is a stainless steel substrate, a cladding coating layer or a spray coating layer. The cladding coating layer and the spray coating layer each include a metallic material.

In some embodiments, the device has one or more of the following parameters: a plasma non-transferred arc voltage of 22 to 25 V, a transferred arc current of 80 to 120 A, a diameter of a tungsten electrode of 3 mm, a forward speed of the plasma gun of 40 to 60 mm/min, a swing speed of the plasma gun of 0 to 1800 mm/min, a swing amplitude of the plasma gun of 0 to 20 mm, a shielding gas being argon with a flow rate of 5 to 20 L/min, and a powder feeding speed of the powder feeder of 1 to 40 g/min.

In a second aspect of the present disclosure, a method for fabricating a ceramic reinforced composite coating based on plasma remelting and injection is provided. The method is applied by the device as described above. In some embodiments, the method includes:

a preliminary operation including:

adjusting positions of the plasma gun and the thermal infrared imager, setting parameters of a plasma remelting process, turning on a power supply, and performing the plasma remelting process on the metal-based substrate, and monitoring the plasma remelting process by the thermal infrared imager;

determination of the optimal injection position of the ceramic particles including:

acquiring a coordinate of a plasma arc beam center and a coordinate of the trailing edge of the molten pool according to the infrared image acquired by the thermal infrared imager and parameters of the plasma gun, determining the midpoint between the trailing edge of the plasma arc beam emitted on the metal-based substrate and the trailing edge of the molten pool as the optimal injection position of the ceramic particles, and acquiring a coordinate of the optimal injection position of the ceramic particles;

adjustment of a position of the powder feeding assembly including:

adjusting a position of the powder feeding copper tube by a horizontal direction-adjustable connecting piece and a vertical direction-adjustable connecting piece, calculating an injection angle according to the optimal injection position of the ceramic particles, and adjusting the injection angle of the powder feeding copper tube by an angle-adjustable connecting piece;

fabrication of the ceramic reinforced metal matrix composite coating based on the plasma remelting and injection including:

setting parameters of a plasma remelting and injection process, activating the plasma generator, the water cooler and the powder feeder, performing the plasma remelting and injection process to obtain the ceramic reinforced metal-based composite coating.

In some embodiments, the plasma arc beam center and the trailing edge of the molten pool are determined according to the infrared image of the thermal infrared imager and the parameters of the plasma gun. An emissivity of the thermal infrared imager is set according to the metal-based substrate, and the infrared image is calibrated according to formula (1):

$$L_1 = L_2 \times \alpha(d) \tag{1}$$

where α(d) is a calibration factor representing a ratio of a real length $L_1$ to a corresponding length $L_2$ of the infrared image.

A centerline and a temperature distribution information of the molten pool and the plasma arc beam are extracted, and the optimal injection position is calculated by formula (2):

$$x_3 = \frac{x_1 + x_2 - r_1 \div a(d)}{2} \tag{2}$$

where $x_1$ represents the coordinate of the trailing edge of the molten pool which has a liquidus temperature of the metal-based substrate determined by the thermal infrared imager, $x_2$ represents the coordinate of the plasma arc beam center which has a highest temperature of a plasma arc beam determined by the thermal infrared imager, $x_3$ represents the coordinate of the optimal injection position, and $r_1$ represents a plasma transferred arc radius, being a parameter of the plasma gun in a range of 1.5 to 3 mm.

In some embodiments, the injection angle of the powder feeding copper tube is controlled by the angle-adjustable connecting piece. The position of the powder feeding copper tube is controlled by the horizontal direction-adjustable connecting piece and the vertical direction-adjustable connecting piece in such a way that a height h between a nozzle center of the powder feeding copper tube and the metal-based substrate is in a range of 8 to 12 mm, and a distance $b_1$ between the nozzle center of the powder feeding copper tube and a center of the plasma gun is in a range of 8 to 20 mm. The injection angle θ of the powder feeding copper tube is adjusted by the angle-adjustable connecting piece. The injection angle θ is calculated by formula (3):

$$\theta = \arctan\frac{h}{b_1 - (x_2 - x_3) \times a(d)}. \tag{3}$$

In some embodiments, the plasma remelting process and the plasma remelting and injection process have at least one of the following process parameters: a plasma non-transferred arc voltage of 22 to 25 V, a transferred arc current of 80 to 120 A, a diameter of a tungsten electrode of 3 mm, a forward speed of the plasma gun of 40 to 60 mm/min, a swing speed of the plasma gun of 0 to 1800 mm/min, a swing amplitude of the plasma gun of 0 to 20 mm, and a shielding gas being argon with a flow rate of 5 to 20 L/min.

In some embodiments, the ceramic particles are one or more selected from the group consisting of WC, TiC, and $Al_2O_3$ and have a particle size in a range of 50 to 300 μm, and the powder feeder has a powder feeding speed of 1 to 40 g/min.

In some embodiments, the metal-based substrate is a stainless steel substrate, a cladding coating layer or a spray coating layer, and the same metal-based substrate is used in the plasma remelting process and the plasma remelting and injection process.

BRIEF DESCRIPTION OF THE DRAWINGS

FIG. 5A is a temperature distribution diagram of a molten pool according to an embodiment of the present disclosure; and FIG. 5B is a temperature distribution diagram of a plasma arc beam according to an embodiment of the present disclosure.

FIG. 6A is a distribution diagram of ceramic particles of a composite coating fabricated by a plasma cladding method, in which the ceramic particles are fed coaxially; and FIG. 6B is a distribution diagram of ceramic particles of a composite coating fabricated by a plasma remelting and injection method according to an embodiment of the present disclosure.

Figure 1:
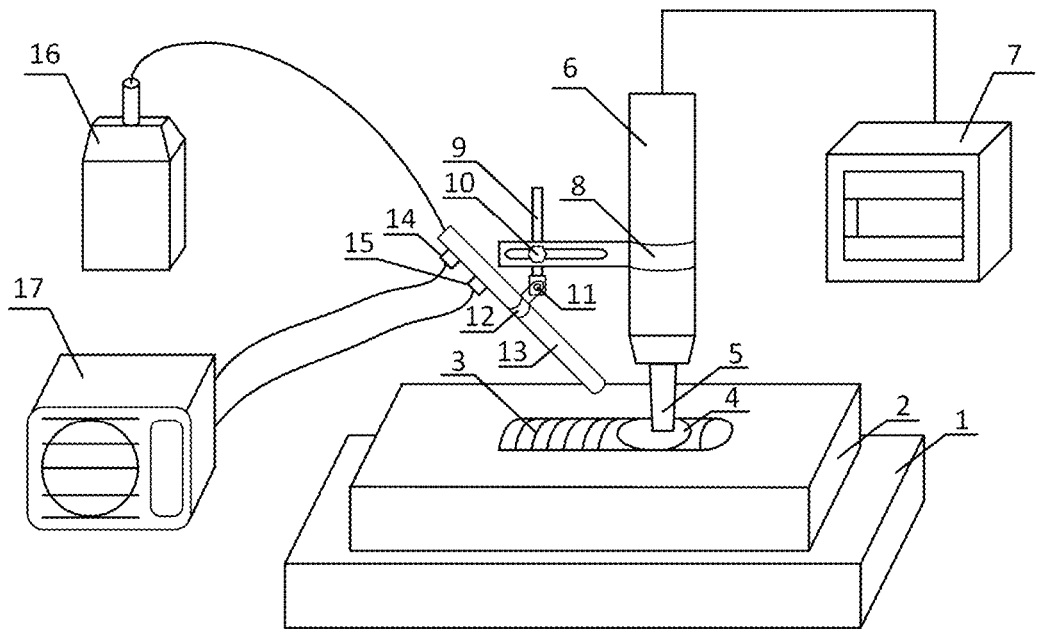
FIG. 1 is a schematic diagram showing a device for fabricating a ceramic reinforced composite coating based on plasma remelting and injection according to an embodiment of the present disclosure.

REFERENCE NUMERALS worktable 1, substrate 2, composite coating 3, molten pool 4, plasma arc beam 5, plasma gun 6, plasma generator 7, horizontal direction-adjustable connecting piece 8, vertical direction-adjustable connecting piece 9, bolt 10, threaded nail 11, angle-adjustable connecting piece 12, powder feeding copper tube 13, water inlet 14, water outlet 15, powder feeder 16, water cooler 17.

DETAILED DESCRIPTION

Embodiments of the present disclosure are described in detail below, examples of which are illustrated in the drawings. The same or similar elements are denoted by same reference numerals in different drawings unless indicated otherwise. The embodiments described herein with reference to drawings are explanatory, and used to generally understand the present disclosure. The embodiments shall not be construed to limit the present disclosure.

In the art, plasma arc is considered to be an environmentally-friendly and high efficient heat source, which has a broad application in the fields of surface modification and dimension recovery.

In manufacturing or remanufacturing large components, the plasma source with high efficiency and low consumption can be used to fabricate a coating on a surface of the workpiece to meet the requirements of industry productivity, energy efficiency and economics. Therefore, the plasma arc is used as the heat source for devices and methods for fabricating the ceramic reinforced metal matrix composite coating according to the embodiments of the present disclosure.

When a plasma cladding technology or plasma melting and injection technology is used to fabricate the ceramic reinforced metal matrix composite coating, there are two types of power feeding manners. The first one is a coaxial powder feeding manner, in which a mixture of ceramic powders and metal powders or ceramic powders alone are fed coaxially (i.e., along a same axis with a plasma injecting axis) to form the ceramic reinforced metal matrix composite coating. Because ceramic particles are directly heated by the high-energy plasma arc before entering the molten pool, the combustion and decomposition of the particles will inevitably occur, and thus the surface strengthening effect is weakened. Elements released by the decomposition of the ceramic particles may be combined with elements in the metal matrix to form multiple types of agglomerated brittle phases, increasing the cracking tendency and potential brittle fracture risk of the composite coating. The second powder feeding manner is that a molten pool is formed by the plasma cladding technology or plasma melting and injection technology, and the ceramic particles are injected into the molten pool at its tail. This manner is further discussed in the embodiments of the present disclosure, it prevents the ceramic particles from contacting the plasma gas directly, and thus the decomposition of the ceramic particles is reduced.

The present disclosure is described with reference to the drawings.

As shown in FIG. 1, a device for fabricating a ceramic reinforced composite coating based on plasma remelting and injection includes: a plasma cladding assembly, a powder feeding assembly, a worktable 1, a metal-based substrate 2 arranged on the worktable 1, and a thermal infrared imager (not shown).

The plasma cladding assembly includes a plasma gun 6 and a plasma generator 7. The plasma gun 6 is arranged above the metal-based substrate 2 and is connected to the plasma generator 7, and the plasma generator 7 is configured to generate a plasma arc beam 5. The plasma arc beam 5 is used to heat the metal-based substrate 2 and thus form a molten pool 4 on a surface of the metal-based substrate 2.

During processing, the plasma gun 6 moves forward, and thus the molten pool 4 is changing all the time. The powder feeding assembly is arranged in rear of the plasma gun 6. The powder feeding assembly includes a powder feeding copper tube 13, a powder feeder 16 and an adjustable connecting assembly. The powder feeding copper tube 13 is connected to the plasma gun 6 via the adjustable connecting assembly, the powder feeder 16 is connected to the powder feeding copper tube 13 and is configured to feed ceramic particles to the molten pool 4 through the powder feeding copper tube 13.

The adjustable connecting assembly includes a horizontal direction-adjustable connecting piece 8, a vertical direction-adjustable connecting piece 9 and an angle-adjustable connecting piece 12. An end of the horizontal direction-adjustable connecting piece 8 is connected to the plasma gun 6, and a horizontal groove is provided at the other end of the horizontal direction-adjustable connecting piece 8. The vertical direction-adjustable connecting piece 9 is provided with a vertical groove, the horizontal groove of the horizontal direction-adjustable connecting piece 8 and the vertical groove of the vertical direction-adjustable connecting piece 9 are connected by a bolt 10, and an end of the vertical direction-adjustable connecting piece 9 is provided with a threaded hole. The angle-adjustable connecting piece 12 is connected to the vertical direction-adjustable connecting piece 9 by fitting a threaded nail 11 into the threaded hole, and is connected to the powder feeding copper tube 13.

For example, the horizontal direction-adjustable connecting piece 8 is connected to the plasma gun 6 via a stainless steel hose clamp. The angle-adjustable connecting piece 12 is connected to the powder feeding copper tube 13 via a stainless steel hose clamp.

The powder feeding assembly further includes a water cooling assembly including a water cooler 17, and a cooling jacket (not shown) surrounding the powder feeding copper tube 13. A water inlet 14 and a water outlet 15 are provided at the cooling jacket. The water cooler 17 is configured to cool the powder feeding copper tube 13 by feeding water into the cooling jacket through the water inlet 14 and discharging water through the water outlet 15.

The thermal infrared imager is configured to acquire an infrared image of the molten pool 4 and acquire an optimal injection position of the ceramic particles according to the infrared image. The optimal injection position is a midpoint between a trailing edge of the plasma arc beam 5 emitted on the metal-based substrate 2 and a trailing edge of the molten pool 4.

Figure 2:
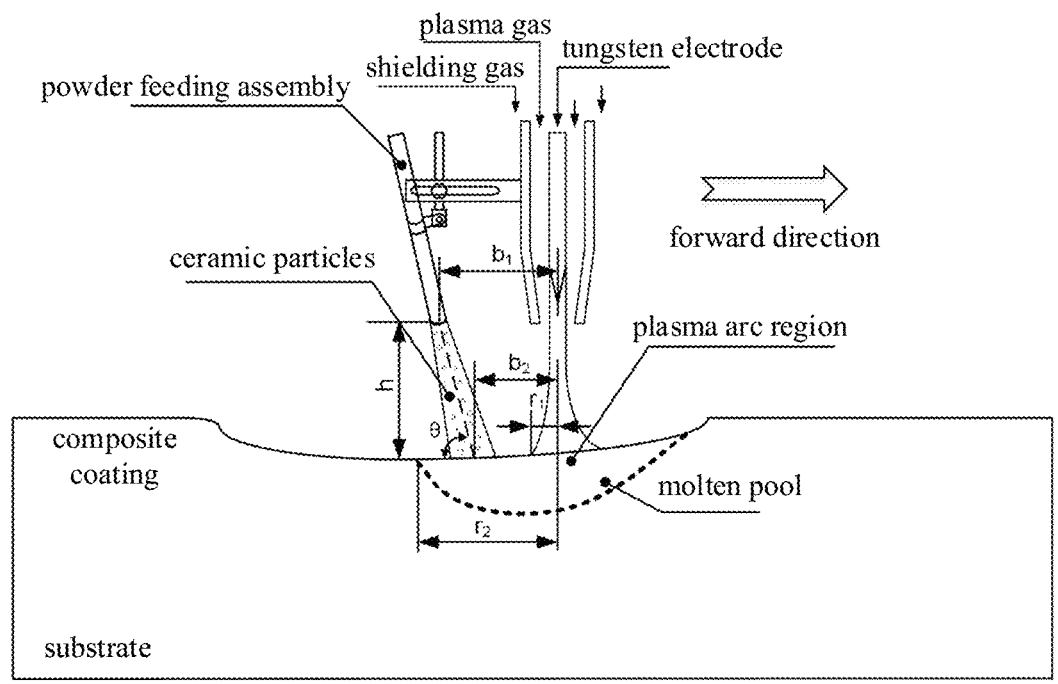
FIG. 2 is a schematic diagram showing an injection position of ceramic particles injected to a substrate according to an embodiment of the present disclosure.
Figure 3A:
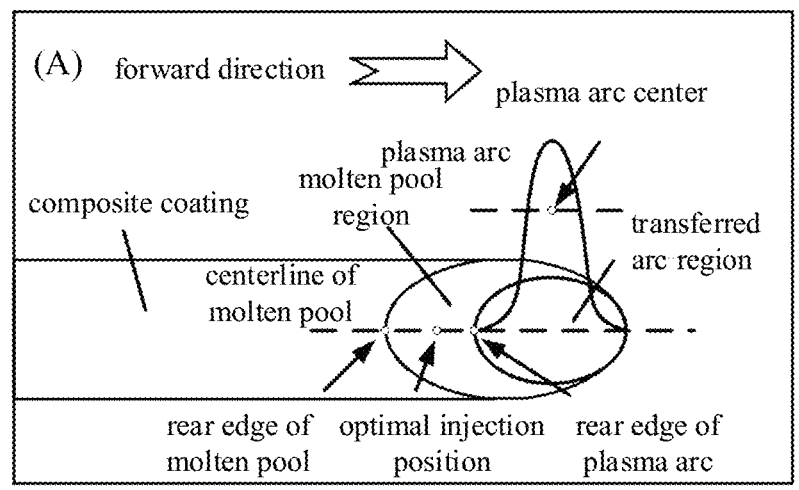
FIG. 3A is a schematic diagram showing an injection position calculated by a thermal infrared imager according to an embodiment of the present disclosure.
Figure 3B:
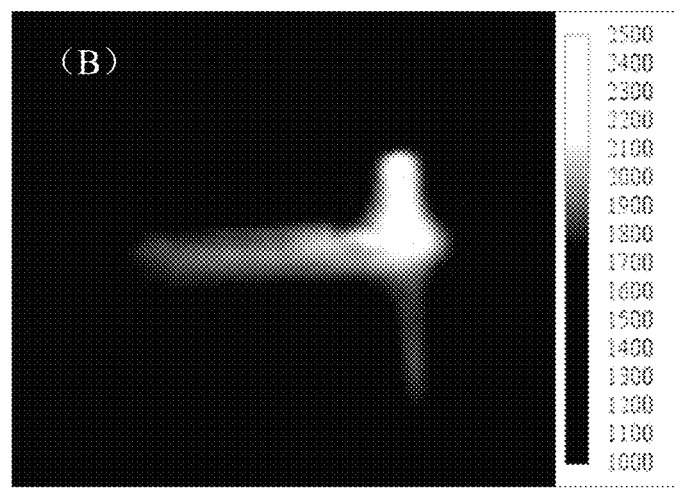
FIG. 3B is a picture captured by a thermal infrared imager according to an embodiment of the present disclosure.

As shown in FIG. 2 and FIG. 3A, the plasma arc generated by the plasma gun 6 is emitted as a beam, and thus the metal-based substrate 2 is melt and form the molten pool 4. Projection of the plasma arc beam 5 on the substrate 2 and the molten pool may have an elliptic shape, and have the same centerline. The midpoint between the trailing edge of the plasma arc beam 5 emitted on the metal-based substrate 2 and the trailing edge of the molten pool 4 refers to a midpoint between a point where the centerline intersects with a rear edge of the molten pool 4 and a point where the centerline intersects with a rear edge of the plasma beam 5 on the substrate 2.

The image acquired by the thermal infrared imager is calibrated according to formula (1):

$$L_1 = L_2 \times \alpha(d) \quad (1)$$

where $\alpha(d)$ is a calibration factor representing a ratio of a real length $L_1$ to a corresponding length $L_2$ of the image.

On this basis, the optimal injection position is calculated by formula (2):

$$x_3 = \frac{x_1 + x_2 - r_1 \div a(d)}{2} \quad (2)$$

where $x_1$ represents a coordinate of the trailing edge of the molten pool 4 which has a liquidus temperature of the metal-based substrate 2 determined by the thermal infrared imager, $x_2$ represents a coordinate of a plasma arc center which has a highest temperature of a plasma arc determined by the thermal infrared imager, $x_3$ represents a coordinate of the optimal injection position, and $r_1$ represents a plasma transferred arc radius, being a parameter of the plasma gun 6. For example, the plasma transferred arc radius is in a range of 1.5 to 3 mm.

The horizontal direction-adjustable connecting piece 8 and the vertical direction-adjustable connecting piece 9 are configured to adjust a position of the powder feeding copper tube 13 in such a way that a height h between a nozzle center of the powder feeding copper tube 13 and the metal-based substrate 2 is in a range of 8 to 12 mm, and a distance $b_1$ between the nozzle center of the powder feeding copper tube 13 and a center of the plasma gun 6 is in a range of 8 to 20 mm.

The angle-adjustable connecting piece 12 is configured to adjust an injection angle θ of the powder feeding copper tube 13, and the injection angle θ is calculated by formula (3):

$$\theta = \arctan \frac{h}{b_1 - (x_2 - x_3) \times a(d)}. \quad (3)$$

As shown in FIG. 2, the angle θ is between an axis line of the powder feeding copper tube 13 and a surface of the substrate or the coating.

The ceramic particles are one or more selected from the group consisting of WC, TiC, and $Al_2O_3$. The ceramic particles have a particle size in a range of 50 to 300 μm. The metal-based substrate 2 may be a stainless steel substrate, a cladding coating layer or a spray coating layer. The cladding coating layer and the spray coating layer each include a metallic material.

The device of the present disclosure may be used under one or more of the following conditions: a plasma non-transferred arc voltage of 22 to 25 V, a transferred arc current of 80 to 120 A, a diameter of a tungsten electrode of 3 mm, a forward speed of the plasma gun 6 of 40 to 60 mm/min, a swing speed of the plasma gun 6 of 0 to 1800 mm/min, a swing amplitude of the plasma gun 6 of 0 to 20 mm, a shielding gas being argon with a flow rate of 5 to 20 L/min, and a powder feeding speed of the powder feeder (16) of 1 to 40 g/min.

With the device of the present disclosure, a method for fabricating a ceramic reinforced composite coating based on plasma remelting and injection can be performed. The method includes the following operations.

(1) Preliminary Operation

Positions of the plasma gun 6 and the thermal infrared imager are adjusted. Parameters of a plasma remelting process are set, and a power supply of the device is turned on. The metal-based substrate 2 is remelt by the plasma arc, and the plasma remelting process is mentioned by the thermal infrared imager.

(2) Determination of the Optimal Injection Position of the Ceramic Particles

A coordinate of a plasma arc beam center and a coordinate of the trailing edge of the molten pool 4 are acquired according to the infrared image acquired by the thermal infrared imager and parameters of the plasma gun 6. The midpoint between the trailing edge of the plasma arc beam 5 emitted on the metal-based substrate 2 and the trailing edge of the molten pool 4 is determined as the optimal injection position of the ceramic particles. A coordinate of the optimal injection position of the ceramic particles is acquired.

(3) Adjustment of a Position of the Powder Feeding Assembly

The position of the powder feeding copper tube 13 is adjusted by the horizontal direction-adjustable connecting piece 8 and the vertical direction-adjustable connecting piece 9. The injection angle is calculated according to the optimal injection position of the ceramic particles, and the injection angle of the powder feeding copper tube 13 is adjusted by the angle-adjustable connecting piece 12 to improve the utilization of the ceramic particles.

(4) Fabrication of a Ceramic Reinforced Metal Matrix Composite Coating Based on the Plasma Remelting And Injection Parameters of a plasma remelting and injection process are set. The plasma generator 7, the water cooler 17 and the powder feeder 16 are activated. The plasma remelting and injection process is performed to obtain the ceramic reinforced metal matrix composite coating 3.

During the preliminary operation, i.e., the plasma remelting process, the parameters of the plasma remelting process are set and the device of the present disclosure is powered on. The metal-based substrate is subjected to the plasma remelting operation, and the thermal infrared imager is used to monitor the remelting process. In combination with the operation (2), the optimal injection position for ceramic particles is determined. In the preliminary operation, the position of the thermal infrared imager can be appropriately selected to have a clear shooting view. The position of the plasma gun, including a distance between the substrate and the plasma gun, and a forward direction on a substrate plane, can be set to achieve the desired coating on the substrate.

Compared with the prior art, the present disclosure has the following beneficial effects.

With the method of the present disclosure, the optimal injection position of the ceramic particles can be accurately calculated according to the data of the plasma remelting process and the thermal imager. The device of the present disclosure can accurately control the position and angle of the powder feeding assembly, which can improve the utilization of the ceramic particles.

The method of the present disclosure is simple to operate, and can form a good-quality ceramic reinforced metal matrix composite coating on a surface of multiple types of substrates such as a spray coating, a spray welding layer, a cladding layer, and stainless steel. Energy input of the plasma arc can be adjusted according to requirements of the substrate, to change an injection depth of the ceramic particles, and thus to form the ceramic reinforced metal matrix composite coatings of different thicknesses.

During the fabrication of the ceramic reinforced metal matrix composite coating of the present disclosure, segregation and thermal decomposition of the ceramic particles can be effectively avoided, and a residual stress of the coating can be effectively reduced, decreasing a cracking risk. Therefore, the ceramic particles better improves the coating, especially enhances the performance of the surface of the coating.

The present disclosure may be further described with the following examples.

EXAMPLE 1

PTA-400E4-ST universal spray welding equipment of Wuhan Institute of Material Protection is used. The plasma gun is located 10 mm above the metal-based substrate (120 mm×80 mm×5 mm, a Fe901 cladding layer). FLIR A655sc thermal imager equipped with a high temperature module is placed at a distance of 0.8 m from the plasma gun. An observation angle is 45° relative to a horizontal plane, a resolution is set to 640×480, and a sampling frequency is 50 Hz. The parameters of the plasma remelting process are set as follows. A non-transferred arc voltage is 25 V, a transferred arc current is 80 A, a diameter of a tungsten electrode is 3 mm, a forward speed of the plasma gun is 50 mm/min, a swing speed of the plasma gun is 1400 mm/min, a swing amplitude of the plasma gun is 14 mm, a shielding gas is argon, and a flow rate is 10 L/min. The plasma remelting operation is performed on the metal-based substrate 2, and the plasma remelting process is monitored with the thermal imager.

Figure 4:
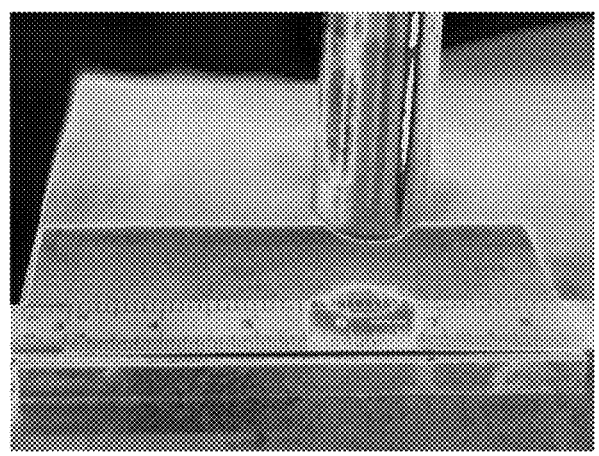
FIG. 4 is a picture showing calibration of an injection position calculated by a thermal infrared imager according to an embodiment of the present invention.

The emissivity of the thermal infrared imager is set as 0.3 according to the metal-based substrate (i.e., the Fe901 cladding layer). A two-dimensional size between two points marked on a preset processing/forward path is measured by a standard physical measuring tool (e.g., as shown in FIG. 4). The image is calibrated by a software system of the imager, and a calibration factor $\alpha(d)$ representing a ratio of a real length $L_1$ to a corresponding length $L_2$ of the image is acquired. In this case, the real length $L_1$ and the corresponding length $L_2$ of the image are in a relationship of $L_1 = L_2 \times 0.536$.

The centerline and the temperature distribution information of the molten pool 4 and the plasma arc beam 5 are extracted as shown in FIGS. 5A and 5B. The substrate has a liquidus temperature of 1221° C. and a point at the centerline of the molten pool having this temperature is determined as a position of the trailing edge of the molten pool. The coordinate $x_1$ of this position is 70. The highest temperature point of the plasma arc is determined as a center position of the plasma arc. The center position of the plasma arc has a coordinate $x_2$ of 105. QLA-160 precision plasma gun is used, and has a plasma transferred arc radius $r_1$ of 1.5 mm. The optimal injection position thus has a coordinate $x_3$ of 86.

The position of the powder feeding copper tube 13 is adjusted by the horizontal direction-adjustable connecting piece and the vertical direction-adjustable connecting piece in such a way that a height h between a nozzle center of the powder feeding copper tube and the metal-based substrate is 10 mm, and a distance $b_1$ between the nozzle center of the powder feeding copper tube and a center of the plasma gun is 19.38 mm. The injection angle is calculated to be 47.4°.

Parameters of the plasma remelting and injection process are set as follows. A non-transferred arc voltage is 25 V, a transferred arc current is 80 A, a diameter of a tungsten electrode is 3 mm, a forward speed of the plasma gun is 50 mm/min, a swing speed of the plasma gun is 1400 mm/min, a swing amplitude of the plasma gun is 14 mm, a shielding gas is argon, and a flow rate is 10 L/min. The plasma remelting operation is performed on the metal-based substrate 2, and the plasma remelting process is monitored with the thermal imager. The ceramic particles fed are cast tungsten carbide powders with a particle size of 50 to 150 μm, and the powder feeder has a powder feeding rate of 11 g/min. The substrate is subjected to the plasma remelting and injection process to obtain a tungsten carbide-reinforced iron-based composite coating 3.

The following formulas (1) to (3) are used for above calculations.

$$L_1 = L_2 \times a(d) \quad (1)$$

$$x_3 = \frac{x_1 + x_2 - r_1 \div a(d)}{2} \quad (2)$$

$$\theta = \arctan\frac{h}{b_1 - (x_2 - x_3) \times a(d)} \quad (3)$$

COMPARATIVE EXAMPLE

In this comparative example, a tungsten carbide-reinforced iron-based composite coating is fabricated by a plasma cladding method with a coaxial powder feeding manner (that is, a mixture of metal powders and ceramic particles is ejected from the plasma gun coaxially with the plasma arc beam, which is known in the art). Parameters are set as follows. A non-transferred arc voltage is 25 V, a transferred arc current is 130 A, a diameter of a tungsten electrode is 3 mm, a forward speed of the plasma gun is 50 mm/min, a swing speed of the plasma gun is 1400 mm/min, a swing amplitude of the plasma gun is 14 mm, a shielding gas is argon, and a flow rate is 10 L/min. The powders coaxially fed are tungsten carbide/Fe901 mixed powders with a particle size of 50 to 150 μm. Based on a total weight of the mixed powders, the tungsten carbide powders have an amount of 30 wt %, and the Fe901 powders have an amount of 70 wt %. A powder feeding rate of a coaxial powder feeder is 36 g/min.

FIG. 6A shows a distribution of the ceramic particles of the composite coating fabricated by the plasma cladding method with the ceramic particles fed coaxially. FIG. 6B shows a distribution of the ceramic particles of the composite coating fabricated by the plasma remelting and injection method of the present disclosure. As shown in FIG. 6A, the tungsten carbide particles of the composite coating fabricated in the coaxial powder feeding manner are segregated at the bottom of the coating, and there are obvious network cracks in the coating. The cracks near the interface pass through multiple ceramic particles. As shown in FIG. 6B, the composite coating fabricated by the plasma remelting and injection method has no obvious cracks, and the ceramic particles are evenly distributed at the top of the coating, which can effectively enhance the coating surface.

Figures 7A, 7B:
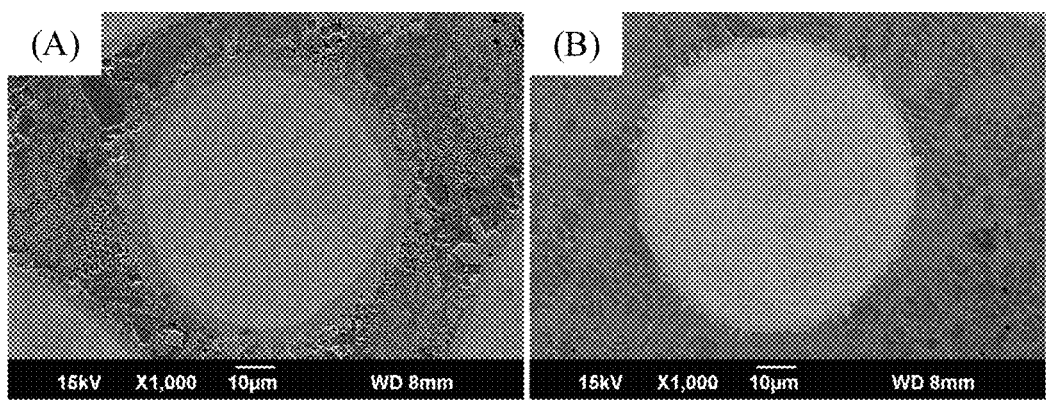
FIG. 7A is a microscopic image of a ceramic particle of a composite coating fabricated by a plasma cladding method, in which the ceramic particles are fed coaxially.
FIG. 7B is a microscopic image of a ceramic particle of a composite coating fabricated by a plasma remelting and injection method according to an embodiment of the present disclosure.

FIG. 7A is a microscopic image of the ceramic particle of the composite coating fabricated by the plasma cladding method with the ceramic particles fed coaxially. FIG. 7B is a microscopic image of the ceramic particle of the composite coating fabricated by the plasma remelting and injection method of the present disclosure. As shown in FIG. 7A, fusion happens to the tungsten carbide ceramic particle of the composite coating fabricated by the coaxial powder feeding manner, and there is a thick alloy layer around the ceramic particle. Moreover, a large number of massive phases are precipitated near the alloy layer, and a eutectic phase is formed in the substrate by reactions.

In contrast, the alloy layer of the tungsten carbide ceramic particle of the composite coating fabricated by the plasma remelting and injection method of the present disclosure is thinner, and the block particles at the edge of the alloy layer are significantly smaller, which proves that the plasma remelting and injection method can effectively reduce the decomposition of the tungsten carbide ceramic particles. In addition, the coating structure around the tungsten carbide particles maintains original dendrites and interdendritic structure.

The above specific embodiments of the present disclosure shall not be construed to limit the present disclosure. Those skilled in the art can obtain alternatives or changes according to the technical solutions and inventive concept of the present disclosure without departing from scope of the present disclosure.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," "counterclockwise," "axial direction," "radial direction" and "circumferential direction" should be construed to refer to the orientation as then described or as shown in the drawings under discussion. These relative terms are for convenience of description and do not require that the present disclosure be constructed or operated in a particular orientation.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A device for fabricating a ceramic reinforced composite coating based on plasma remelting and injection, comprising: a plasma cladding assembly, a powder feeding assembly, a worktable (1), a metal-based substrate (2) arranged on the worktable (1), and a thermal infrared imager, wherein the plasma cladding assembly comprises a plasma gun (6) and a plasma generator (7), wherein the plasma gun (6) is arranged above the metal-based substrate (2) and is connected to the plasma generator (7), and the plasma generator (7) is configured to generate a plasma arc beam (5), and the plasma arc beam (5) is used to heat the metal-based substrate (2) and form a molten pool (4) on a surface of the metal-based substrate (2), wherein the powder feeding assembly comprises a powder feeding copper tube (13), a powder feeder (16) and an adjustable connecting assembly, wherein the powder feeding copper tube (13) is connected to the plasma gun (6) via the adjustable connecting assembly, the powder feeder (16) is connected to the powder feeding copper tube (13) and is configured to feed ceramic particles to the molten pool (4) through the powder feeding copper tube (13), wherein the thermal infrared imager is configured to acquire an infrared image of the molten pool (4) and acquire an optimal injection position of the ceramic particles according to the infrared image, wherein the optimal injection position is a midpoint between a trailing edge of the plasma arc beam (5) emitted on the metal-based substrate (2) and a trailing edge of the molten pool (4), wherein the adjustable connecting assembly comprises a horizontal direction-adjustable connecting piece (8), a vertical direction-adjustable connecting piece (9) and an angle-adjustable connecting piece (12), wherein an end of the horizontal direction-adjustable connecting piece (8) is connected to the plasma gun (6), and a horizontal groove is provided at the other end of the horizontal direction-adjustable connecting piece (8), wherein the vertical direction-adjustable connecting piece (9) is provided with a vertical groove, the horizontal groove of the horizontal direction-adjustable connecting piece (8) and the vertical groove of the vertical direction-adjustable connecting piece (9) are connected by a bolt (10), and an end of the vertical direction-adjustable connecting piece (9) is provided with a threaded hole, wherein the angle-adjustable connecting piece (12) is connected to the vertical direction-adjustable connecting piece (9) by fitting a threaded nail (11) into the threaded hole, and is connected to the powder feeding copper tube (13), and wherein the horizontal direction-adjustable connecting piece (8) is connected to the plasma gun (6) via a stainless steel hose clamp, and/or the angle-adjustable connecting piece (12) is connected to the powder feeding copper tube (13) via a stainless steel hose clamp.

2. The device according to claim 1, wherein the powder feeding assembly further comprises a water cooling assembly comprising a water cooler (17), and a cooling jacket surrounding the powder feeding copper tube (13), wherein a water inlet (14) and a water outlet (15) are provided at the cooling jacket, the water cooler (17) is configured to cool the powder feeding copper tube (13) by feeding water into the cooling jacket through the water inlet (14) and discharging water through the water outlet (15).

3. The device according to claim 1, wherein the image acquired by the thermal infrared imager is calibrated according to formula (1):

$$L_1 = L_2 \times \alpha(d) \qquad (1)$$

where $\alpha(d)$ is a calibration factor representing a ratio of a real length $L_1$ to a corresponding length $L_2$ of the image.

4. The device according to claim 3, wherein the optimal injection position is calculated by formula (2):

$$x_3 = \frac{x_1 + x_2 - r_1 \div a(d)}{2} \qquad (2)$$

where $x_1$ represents a coordinate of the trailing edge of the molten pool (4) which has a liquidus temperature of the metal-based substrate (2) determined by the thermal infrared imager, $x_2$ represents a coordinate of a plasma arc beam center which has a highest temperature of a plasma arc beam determined by the thermal infrared imager, $x_3$ represents a coordinate of the optimal injection position, and $r_1$ represents a plasma transferred arc radius, being a parameter of the plasma gun (6).

5. The device according to claim 4, wherein the plasma transferred arc radius is in a range of 1.5 to 3 mm.

6. The device according to claim 4, wherein a horizontal direction-adjustable connecting piece (8) and a vertical direction-adjustable connecting piece (9) are configured to adjust a position of the powder feeding copper tube (13) in such a way that a height h between a nozzle center of the powder feeding copper tube (13) and the metal-based substrate (2) is in a range of 8 to 12 mm, and a distance $b_1$ between the nozzle center of the powder feeding copper tube (13) and a center of the plasma gun (6) is in a range of 8 to 20 mm.

7. The device according to claim 6, wherein an angle-adjustable connecting piece (12) is configured to adjust an injection angle θ of the powder feeding copper tube (13), wherein the injection angle θ is calculated by formula (3):

$$\theta = \arctan \frac{h}{b_1 - (x_2 - x_3) \times a(d)}. \qquad (3)$$

8. The device according to claim 1, wherein the ceramic particles are one or more selected from the group consisting of WC, TiC, and $Al_2O_3$, and/or have a particle size in a range of 50 to 300 μm.

9. The device according to claim 1, wherein the metal-based substrate (2) is a stainless steel substrate, a cladding coating layer or a spray coating layer, wherein the cladding coating layer and the spray coating layer each comprise a metallic material.

10. The device according to claim 1, wherein the device has one or more of the following parameters:
- a plasma non-transferred arc voltage of 22 to 25 V,
- a transferred arc current of 80 to 120 A,
- a diameter of a tungsten electrode of 3 mm,
- a forward speed of the plasma gun (6) of 40 to 60 mm/min,
- a swing speed of the plasma gun (6) of 0 to 1800 mm/min,
- a swing amplitude of the plasma gun (6) of 0 to 20 mm,
- a shielding gas being argon with a flow rate of 5 to 20 L/min, and
- a powder feeding speed of the powder feeder (16) of 1 to 40 g/min.

11. A method for fabricating a ceramic reinforced composite coating based on plasma remelting and injection, applied by the device according to claim 1, the method comprising:
- a preliminary operation comprising:
    - adjusting positions of the plasma gun (6) and the thermal infrared imager, setting parameters of a plasma remelting process, turning on a power supply, and performing the plasma remelting process on the metal-based substrate (2), and monitoring the plasma remelting process by the thermal infrared imager;
- determination of the optimal injection position of the ceramic particles comprising:
    - acquiring a coordinate of a plasma arc beam center and a coordinate of the trailing edge of the molten pool (4) according to the infrared image acquired by the thermal infrared imager and parameters of the plasma gun (6), determining the midpoint between the trailing edge of the plasma arc beam (5) emitted on the metal-based substrate (2) and the trailing edge of the molten pool (4) as the optimal injection position of the ceramic particles, and acquiring a coordinate of the optimal injection position of the ceramic particles;
- adjustment of a position of the powder feeding assembly comprising:
    - adjusting a position of the powder feeding copper tube (13) by a horizontal direction-adjustable connecting piece (8) and a vertical direction-adjustable connecting piece (9), calculating an injection angle according to the optimal injection position of the ceramic particles, and adjusting the injection angle of the powder feeding copper tube (13) by an angle-adjustable connecting piece (12);
- fabrication of the ceramic reinforced metal-based composite coating based on the plasma remelting and injection comprising:
    - setting parameters of a plasma remelting and injection process, activating the plasma generator (7), a water cooler (17) and the powder feeder (16), performing the plasma remelting and injection process to obtain the ceramic reinforced metal-based composite coating.

12. The method according to claim 11, wherein the plasma arc beam center and the trailing edge of the molten pool (4) are determined according to the infrared image of the thermal infrared imager and the parameters of the plasma gun (6),
wherein an emissivity of the thermal infrared imager is set according to the metal-based substrate (2), and the infrared image is calibrated according to formula (1):

$$L_1 = L_2 \times \alpha(d) \qquad (1)$$

where $\alpha(d)$ is a calibration factor representing a ratio of a real length $L_1$ to a corresponding length $L_2$ of the infrared image,
wherein a centerline and a temperature distribution information of the molten pool (4) and the plasma arc beam (5) are extracted, and the optimal injection position is calculated by formula (2):

$$x_3 = \frac{x_1 + x_2 - r_1 \div a(d)}{2} \qquad (2)$$

where $x_1$ represents the coordinate of the trailing edge of the molten pool (4) which has a liquidus temperature of the metal-based substrate (2) determined by the thermal infrared imager,
$x_2$ represents the coordinate of the plasma arc beam center which has a highest temperature of a plasma arc beam determined by the thermal infrared imager,
$x_3$ represents the coordinate of the optimal injection position, and
$r_1$ represents a plasma transferred arc radius, being a parameter of the plasma gun (6) in a range of 1.5 to 3 mm.

13. The method according to claim 12, wherein the injection angle of the powder feeding copper tube (13) is controlled by the angle-adjustable connecting piece (12),
wherein the position of the powder feeding copper tube (13) is controlled by the horizontal direction-adjustable connecting piece (8) and the vertical direction-adjustable connecting piece (9) in such a way that a height h between a nozzle center of the powder feeding copper tube (13) and the metal-based substrate (2) is in a range of 8 to 12 mm, and a distance $b_1$ between the nozzle center of the powder feeding copper tube (13) and a center of the plasma gun (6) is in a range of 8 to 20 mm, and
wherein the injection angle θ of the powder feeding copper tube (13) is adjusted by the angle-adjustable connecting piece (12), wherein the injection angle θ is calculated by formula (3):

$$\theta = \arctan\frac{h}{b_1 - (x_2 - x_3) \times a(d)}. \qquad (3)$$

14. The method according to claim 11, wherein the plasma remelting process and the plasma remelting and injection process have at least one of the following process parameters:
- a plasma non-transferred arc voltage of 22 to 25 V,
- a transferred arc current of 80 to 120 A,
- a diameter of a tungsten electrode of 3 mm,
- a forward speed of the plasma gun (6) of 40 to 60 mm/min,
- a swing speed of the plasma gun (6) of 0 to 1800 mm/min,
- a swing amplitude of the plasma gun (6) of 0 to 20 mm, and
- a shielding gas being argon with a flow rate of 5 to 20 L/min.

15. The method according to claim 11, wherein the ceramic particles are one or more selected from the group consisting of WC, TiC, and $Al_2O_3$ and have a particle size in a range of 50 to 300 μm, and the powder feeder (16) has a powder feeding speed of 1 to 40 g/min.

16. The method according to claim 11, wherein the metal-based substrate (2) is a stainless steel substrate, a cladding coating layer or a spray coating layer, and the same metal-based substrate (2) is used in the plasma remelting process and the plasma remelting and injection process.

* * * * *